US011936176B2

(12) United States Patent
Boury et al.

(10) Patent No.: US 11,936,176 B2
(45) Date of Patent: Mar. 19, 2024

(54) CONTACTOR, AN INTEGRATED CIRCUIT, A METHOD OF INTERRUPTING A CURRENT FLOW

(71) Applicant: Melexis Technologies SA, Bevaix (CH)

(72) Inventors: Bruno Boury, Tessenderlo (BE); Stephane Rauw, Tessenderlo (BE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 17/667,986

(22) Filed: Feb. 9, 2022

(65) Prior Publication Data
US 2022/0278520 A1   Sep. 1, 2022

(30) Foreign Application Priority Data

Mar. 1, 2021   (EP) .................................... 21159992

(51) Int. Cl.
*H02H 3/08*   (2006.01)
*H02H 1/00*   (2006.01)
*H02H 3/05*   (2006.01)
*H02H 9/02*   (2006.01)

(52) U.S. Cl.
CPC ............ *H02H 3/08* (2013.01); *H02H 1/0007* (2013.01); *H02H 3/05* (2013.01)

(58) Field of Classification Search
CPC ........... H02H 3/08; H02H 3/05; H02H 1/0007
USPC ....................................................... 361/93.1
See application file for complete search history.

(56) References Cited

U.S. PATENT DOCUMENTS

| 6,037,749 A * | 3/2000 | Parsonage .......... G01R 31/3842 320/132 |
| 9,064,661 B2 * | 6/2015 | Westrick, Jr. .......... H01H 47/22 |
| 2013/0043111 A1 * | 2/2013 | Venkitachalam ...... H01H 71/04 200/329 |
| 2014/0292109 A1 | 10/2014 | Kamata et al. |
| 2015/0236501 A1 * | 8/2015 | Lee .......................... H02H 7/18 361/57 |
| 2017/0358832 A1 * | 12/2017 | Sun ..................... H01M 50/505 |

(Continued)

FOREIGN PATENT DOCUMENTS

WO   2020/193466 A1   10/2020

OTHER PUBLICATIONS

Extended European Search Report from corresponding EP Application 21159992.3, dated Sep. 9, 2021.

*Primary Examiner* — Jared Fureman
*Assistant Examiner* — Lucy M Thomas
(74) *Attorney, Agent, or Firm* — Workman Nydegger

(57) ABSTRACT

A contactor includes: a first and second power terminal; a sub-circuit connected between this first and second power terminal and comprising the following three elements connected in series: an electrical conductor portion, a primary switch, and a fuse. The primary switch has a movable part driven by an actuator. The contactor further has a magnetic sensor for measuring a primary current flowing through the electrical conductor portion, and a controller connected to the magnetic sensor and to the actuator. The controller has a communication port for receiving commands. The contactor can detect whether the primary switch is actually open. The controller is configured for: (i) receiving a command to open the switch; (ii) operating the actuator; (iii) detecting if the primary switch is actually open; and (iv) blowing the fuse if the switch is not open.

18 Claims, 9 Drawing Sheets

(56) References Cited

U.S. PATENT DOCUMENTS

2018/0069411 A1    3/2018  Kim
2018/0281602 A1*  10/2018  Strasser ................ B60L 3/0007
2019/0123542 A1    4/2019  Kambham

* cited by examiner

600

CONTACTOR, AN INTEGRATED CIRCUIT, A METHOD OF INTERRUPTING A CURRENT FLOW

FIELD OF THE INVENTION

The present invention relates in general to the field of electrical power circuits, and more in particular to a contactor for selectively connecting and disconnecting a battery of an electric or hybrid vehicle to/from an electric load, to an integrated circuit, and to a method of interrupting a current flow.

BACKGROUND OF THE INVENTION

The motor of an electric vehicle (EV) or a hybrid vehicle (HV) may be powered by a battery providing a voltage in the range from about 200 Volt to about 800 V, or even more. The battery may be capable of providing a current having a magnitude up to about 1500 Amps, with current peaks up to 3000 Amps or even more. Needless to say, the electric power circuit of such vehicles poses a potential threat to its passengers. For safety reasons, a malfunction of the electrical power circuit and/or of the battery itself should be detected and remedied rapidly, e.g. some malfunctions need to be detected within 5 ms.

In such vehicles, a contactor is typically used to selectively connect and disconnect the battery to/from the electric motor or to/from the charging circuit under normal circumstances. The electrical power circuit may further comprise a fuse to open the circuit in case of an emergency, e.g. in case of a collision.

US2014292109(A1) describes a contactor apparatus comprising a current sensor for use in an electric vehicle (EV) or a hybrid vehicle (HV).

There is always room for improvements or alternatives.

SUMMARY OF THE INVENTION

It is an object of embodiments of the present invention to provide a contactor for use in an electric or a hybrid vehicle, in particular electric and/or hybrid cars.

It is an object of embodiments of the present invention to provide an electric power circuit comprising such a contactor, and an electrical vehicle comprising such a power circuit.

It is an object of embodiments of the present invention to provide a method of interrupting a current flowing through such a contactor.

It is an object of embodiments of the present invention to provide an integrated circuit for performing such a method.

It is an object of embodiments of the present invention to provide a contactor having a switch, and furthermore capable of measuring a current and interrupting that current.

It is an object of embodiments of the present invention to provide a contactor which has an improved reliability (in terms of being able to stop the current from flowing) and/or which has an improved lifetime, and preferably both.

It is an object of embodiments of the present invention to provide an electric power circuit comprising such a contactor, which electrical power circuit offers an improved safety and/or has an improved lifetime, and preferably both.

It is an object of embodiments of the present invention to provide an integrated circuit for performing such a method faster, and/or more efficiently, and/or more reliably.

These and other objects are accomplished by a contactor, by an electric power circuit, by a method of interrupting a current flowing through a contactor, and by an integrated circuit according to embodiments of the present invention.

According to a first aspect, the present invention provides a contactor comprising: a first power terminal; a second power terminal; a sub-circuit electrically connected between the first power terminal and the second power terminal, and comprising at least the following three elements connected in series: an electrical conductor portion, a primary switch (also referred to herein as "High Voltage switch" or "HV switch") and a fuse; the primary switch comprising a movable part driven by an actuator; a magnetic sensor configured for measuring a primary current (also referred to herein as "High Voltage current" or "HV current") flowing through the electrical conductor portion; a controller communicatively connected to said magnetic sensor for measuring said primary current flowing through the electrical conductor portion, and operatively connected to said actuator for selectively opening and closing said switch; wherein the contactor further comprises detection means for detecting whether the primary switch is actually open or closed; and wherein the controller is configured for: (i) measuring a primary current, and detecting if an overcurrent condition occurs; and if an overcurrent condition is detected, continuing with step ii) otherwise repeating step i); (ii) operating the actuator to open the primary switch; (iii) detecting if the primary switch is effectively open; and if it is detected that the primary switch is still closed (e.g. after a time interval Δt), blowing the fuse.

The time interval Δt may be a predefined time interval, or may be calculated as a function of the measured HV current (e.g. using a look-up table). The time period may be determined only once, after a measurement of the HV current, or may be dynamically adjusted or updated (based on ongoing HV current measurement values).

The "first power terminal" may be connected or connectable (directly or indirectly) to a battery. The "second power terminal" may be connected or connectable (directly or indirectly) to an electrical motor.

It is an advantage that the magnetic sensor can measure the primary current in a contactless manner. This allows the magnetic sensor to operate on a (relative) low voltage (e.g. at most 48 Volt).

It is a major advantage that the contactor is able to detect itself, without having to communicate with an external device, and in a manner which does not rely on the measurement from the magnetic sensor, whether the switch is effectively open or closed using said detection means, because this shortens the feedback-loop, which in turn provides extra time during which an attempt can be made to open the switch using the actuator rather than having to blow the fuse. Or stated in other words, it is an advantage of this contactor that (under certain conditions, e.g. if the HV current is lower than a certain value), it can first try to open the switch in a reversible manner, which may not be possible if valuable time was lost due to communication with other devices (e.g. the external processor). By shortening the communication loop or decision loop, the probability of having to blow the fuse because of not-enough-time can be reduced.

It is an advantage that the "detection means" provides a way to perform an internal diagnostics in a manner which is independent from the current measurement performed by the magnetic sensor. Or in other words, it is an advantage that the switch can be operated in a closed-loop manner (i.e. a forward operation plus feedback). In this way the reliability of the contactor can be increased, and the safety of an electrical power system in which this contactor is used, can be improved.

Detection of an overcurrent condition may comprise: comparing the measured HV current with a predefined value, or may comprise or may be based on a classical I2T (ampere-squared time seconds) technique.

The "first power terminal" may be connected or connectable (directly or indirectly) to a battery. The "second power terminal" may be connected or connectable (directly or indirectly) to an electrical motor or two or three phase converter.

It is an advantage that the fuse is connected in series with the primary switch, because this allows that the HV current can be interrupted, even if the primary switch does not open.

The step of "detecting an overcurrent condition" may comprise: comparing the measured current with a predefined threshold.

The step of "detecting an overcurrent condition" may comprise: calculating an I2T value (ampere squared seconds) over time, and comparing this value with a predefined threshold value.

In an embodiment, the controller is configured for: a) repeatedly (e.g. periodically) measuring a primary current flowing through the electrical conductor portion using the magnetic sensor; b) detecting if an overcurrent condition occurred based on the (e.g. periodically) measured primary current, and if it is detected that an overcurrent occurred, continuing with step c); c) determining an available time period (e.g. Δtav) to open the primary switch, e.g. as a function of the measured current value(s); d) comparing the available time period (Δtav) and a required time period (Δtreq) to open the primary switch, and if the available time period is smaller than the required time period, continuing with step g); otherwise continuing with step e); e) operating the actuator to open the primary switch; f) detecting whether the primary switch is effectively open within the available time period (Δtav) using the detection means, and in case the primary switch is still closed after the available time period (Δtav), blowing the fuse.

As stated above, the opening of the switch may or will be triggered (at least) by the receipt of a corresponding command from an external processor (e.g. an ECU).

In an embodiment, the controller has at least one communication port connectable to an external processor; and the controller is further configured for receiving at least one command selected from the group consisting of: a command to close the switch, a command to open the switch, a command to blow the fuse; and the controller is further configured for performing at least one of the following: (x) upon receipt of a command to close the switch, to operate the actuator to close the primary switch; (y) upon receipt of a command to open the switch, to perform step ii) and iii); (z) upon receipt of a command to blow the fuse, to blow the fuse.

In some embodiments, performing step ii) and iii) may be implemented by performing step a) and steps c) to g).

In an embodiment, the contactor is capable of conducting a current of at least 60 Amps (or at least 75 Amps, or at least 100 Amps, or at least 125 Amps); and the contactor further comprises a third and a fourth power terminal for receiving a voltage supply of at most 48 Volt (or at most 36V, or at most 24V, or at most 12V).

This voltage is referred to herein as the "Low voltage supply". This low voltage may be supplied by a second battery, which is not intended to power a motor of a vehicle but intended to power the control circuitry. At least the controller, the actuator, the detection means, and the magnetic sensor are powered by the low voltage supply.

The high-voltage domain and the low-voltage domain are galvanically separated. It is an advantage of using a magnetic sensor, preferably physically located in close vicinity of the electrical conductor portion but galvanically separated therefrom, in that it allows circuitry in the low-voltage domain to measure the current flowing in the high-voltage domain, namely, through the electrical conductor portion.

In an embodiment, the fuse is or comprises a pyro-fuse or a squib.

In an embodiment, the actuator comprises a coil and an element which is movable relative to said coil. The actuator may further comprise a spring biased for opening the switch (NO type) or biased for closing the switch (NC type).

In an embodiment, the controller is further configured for measuring a secondary current flowing through the coil; and the controller is further configured for determining the primary current based on the signal obtained from the magnetic sensor and taking into account the secondary current.

The signal obtained from the magnetic sensor itself may be corrected for a magnetic field generated by the coil at the position of the magnetic sensor, for example by subtracting the secondary current value multiplied by a predefined constant from the primary current value. In this way, the current flowing through the electrical conductor portion can be measured with improved accuracy, while at the same time allowing a compact design (the magnetic sensor and the coil may be relatively close together, and magnetic shielding is not absolutely required).

In an embodiment, the detection means comprises a shunt resistor configured for measuring a current flowing through the actuation means; and the controller is further configured for measuring a voltage over this shunt resistor in order to determine a current flowing through the shunt resistor and through the coil; and wherein the controller is further configured for repeatedly (e.g. periodically) sampling the current flowing through this shunt resistor thereby obtaining a current waveform, and for analysing this current waveform in order to detect a characteristic indicative of movement of the movable element.

In an embodiment, the detection means comprises a position sensor (e.g. a magnetic position sensor, e.g. based on the magnetic field emitted by a permanent magnet) for detecting a position of the movable element; and the controller is connected to said position sensor for determining the position of the movable element, thereby determining the status of the switch (i.e. open or closed).

In an embodiment, the magnetic sensor comprises at least one horizontal Hall element, or at least one vertical Hall element, or at least one magneto-resistive element, arranged in the vicinity of said electrical conductor portion, and configured for measuring a magnetic field component generated by the current flowing through said electrical conductor portion.

In this embodiment, the controller may determine the current flowing through the electrical conductor portion as being proportional to the measured magnetic field component.

A magnetic shield may be provided in the vicinity of the magnetic sensor, in order to reduce the influence from an external disturbance field, or from the actuator coil.

In an embodiment, the magnetic sensor comprises at least two horizontal Hall elements or at least two vertical Hall elements, spaced apart from each other and oriented in parallel, and configured for measuring a magnetic field difference or a magnetic field gradient.

In this embodiment, the controller may determine the current flowing through the electrical conductor portion as being proportional to the magnetic field difference or the magnetic field gradient. It is an advantage of using a magnetic field gradient that it reduces a magnetic disturbance field.

In an embodiment, the contactor further comprises a temperature sensor, mounted in the vicinity of the magnetic sensor (e.g. integrated on the same semiconductor substrate), for measuring a temperature of the magnetic sensor, and the controller is further configured for taking into account the temperature of the magnetic sensor when converting the magnetic field value into a current value. (e.g. for performing a temperature correction). In this way, the accuracy of the signal can be further improved.

In an embodiment, the contactor further comprises an accelerometer and/or a gyroscope connected to the controller; and the controller is further adapted for determining an abnormal condition (e.g. a collision occurred, or a vehicle is oriented upside-down after falling from a bridge, or the like) based on signals obtained from said accelerometer and/or said gyroscope; and wherein the controller is further configured for autonomously opening the primary switch and/or to blow the fuse if an abnormal condition is detected, e.g. by analysing certain parameters (e.g. acceleration parameters or orientation parameters).

In an embodiment, the controller is implemented in an integrated semiconductor device; and the magnetic sensor is also integrated in said semiconductor device; (e.g. in the same packaged device, e.g. as a separate component on the lead frame, or integrated on the same silicon substrate as the controller); and wherein the actuator comprises a coil connected in series with a second switch; and wherein the detection means comprises a shunt resistor connected in series with said coil; and wherein the controller is configured for sampling a first voltage over said shunt resistor, and for sampling a second voltage over said coil or over the series connection of said coil and said shunt resistor, and for determining a status of the primary switch based on the first and second voltage samples; and wherein the controller has a first output for controlling the actuator for operating the primary switch; and wherein the controller has a second output for blowing the fuse.

The controller may further comprise an analog-to-digital convertor (ADC), and a timer, and a clock circuit, and a non-volatile memory (e.g. flash), and a PWM-module, etc.

According to another aspect, the present invention also provides a power circuit, comprising: an electrical battery for providing electrical power; an electric load comprising an electrical motor; a contactor according to any of the previous claims, connected to said battery by means of its first power terminal, and connected to said electric load by means of its second power terminal, or vice versa.

The electrical load may further comprise a three-phase convertor.

According to another aspect, the present invention also provides an electric or a hybrid vehicle, comprising a contactor according to the first aspect, or a power circuit according to the second aspect.

The electrical vehicle may further comprise at least one airbag.

The electrical vehicle may further comprise an Engine Control Unit (ECU), connected to the contactor via said communication port. The ECU may be configured to provide a signal to the contactor to open the switch based on a signal obtained from the airbag.

According to another aspect, the present invention also provides a method of interrupting a current flowing through a contactor according to the first aspect, the method comprising the steps: (i) measuring the primary current flowing through the electrical conductor portion, and detecting if an overcurrent condition occurs; and if an overcurrent condition is detected, continuing with step ii) otherwise repeating step i); ii) operating the actuator in order to, or in an attempt to open the primary switch; iii) detecting if the primary switch is effectively open; and if it is detected that the primary switch is still closed after a time interval ($\Delta tav$), blowing the fuse.

Step i) may comprise the optional step of determining an available time period $\Delta tav$ based on the measured current. Since step ii) takes some time, it is possible in some embodiments to continue measuring the current, and to dynamically update the available time period $\Delta tav$.

According to another aspect, the present invention also provides a method of interrupting a current flowing through a contactor according to the first aspect, the method comprising the steps: a) repeatedly (e.g. periodically) measuring a primary current flowing through the electrical conductor portion of the contactor using the magnetic sensor; b) determining an available amount of time to open the primary switch (e.g. according to a predefined safety criterion), optionally as a function of the measured current; c) comparing the available time and a typically required time to open the primary switch, and if the available time is smaller than the typically required time, continuing with step f); otherwise continuing with step d); d) operating the actuator in order to open the primary switch; e) detecting whether the primary switch is effectively open within the available time period using the detection means, and in case the primary switch is still closed after the available time period blowing the fuse.

According to another aspect, the present invention also provides an integrated circuit for use in the contactor according to the first aspect, the integrated circuit comprising: said controller in the form of a programmable processor; said magnetic sensor; (e.g. in the form of a Horizontal Hall element, or a vertical Hall element, or a circuit comprising a magneto-resistive element); a shunt interface for sensing a voltage over a shunt resistor connectable to the integrated circuit, from which voltage a secondary current can be determined; a voltage sensing interface for sensing a voltage over a coil; a first output for driving an actuator connected to a primary switch; a second output for activating a fuse driver (e.g. a pyro-fuse driver); wherein the processor is configured for: i) measuring a primary current using said magnetic sensor, and detecting if an overcurrent condition occurs; and if an overcurrent condition is detected, continuing with step ii) otherwise repeating step i); ii) asserting the first output for operating the actuator in order to, or in an attempt to open a primary switch; iii) detecting if the primary switch is effectively open by analysing signals obtained from the shunt interface and signals obtained from the voltage sensing interface; and if it is detected that the primary switch is still closed after a time interval, asserting the second output for blowing the fuse.

The present invention also provides a variant of the integrated circuit (illustrated in FIG. 6), wherein the shunt interface and the voltage interface and the first output are omitted, but wherein the integrated circuit comprises an integrated shunt resistor and a transistor, operatively connected to a coil interface.

The integrated circuit preferably also comprises an analog-to-digital converter configured for digitizing a signal obtained from the shunt interface and configured for digitizing a signal obtained from the voltage sensing interface.

The shunt interface may comprise one or two dedicated input pins, over which a voltage is measured.

The voltage sensing interface may comprise one or two dedicated input pins, one of which may be shared with the shunt interface.

The integrated circuit preferably further comprises a non-volatile memory embedded in or connected to said processor. The non-volatile memory may contain data corresponding to a current versus time curve. The non-volatile memory preferably also comprises a computer program or code fragments comprising executable instructions for performing one of the above-described methods or some or all of the above-mentioned method steps, when being executed by the programmable processor.

In an embodiment, the integrated circuit further comprises a digital communication interface for receiving instructions from an external processor (e.g. from an external ECU); and wherein the processor is further configured for performing steps ii) and iii) upon receipt of an instruction (or a command) from the external processor to open the switch.

In an embodiment, the integrated circuit furthermore comprises one or more of the following features: a low-voltage supply input, e.g. a 12 Volt supply input or a 24V supply input; a PWM-generator; a timer unit; an NTC interface (Negative Temperature Coefficient component) to measure an external temperature; a first communication interface for communicating with an airbag ECU; a second communication interface for communicating with a controller of a battery management system (MBS).

The integrated circuit may be embedded in a semiconductor substrate and incorporated in a packaged semiconductor device (also referred to as "chip").

According to another aspect, the present invention also provides a contactor comprising: a first power terminal; a second power terminal; a sub-circuit electrically connected between the first power terminal and the second power terminal, and comprising at least the following three elements connected in series: an electrical conductor portion, a primary switch comprising a movable part driven by an actuator, and a fuse; a magnetic sensor configured for measuring a primary current flowing through the electrical conductor portion; a controller communicatively connected to said magnetic sensor for measuring said primary current flowing through the conductor portion, and operatively connected to said actuator for selectively opening and closing said primary switch; wherein the controller has a communication port connectable to an external processor (BMS; ECU) for receiving a command to open or to close the switch.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
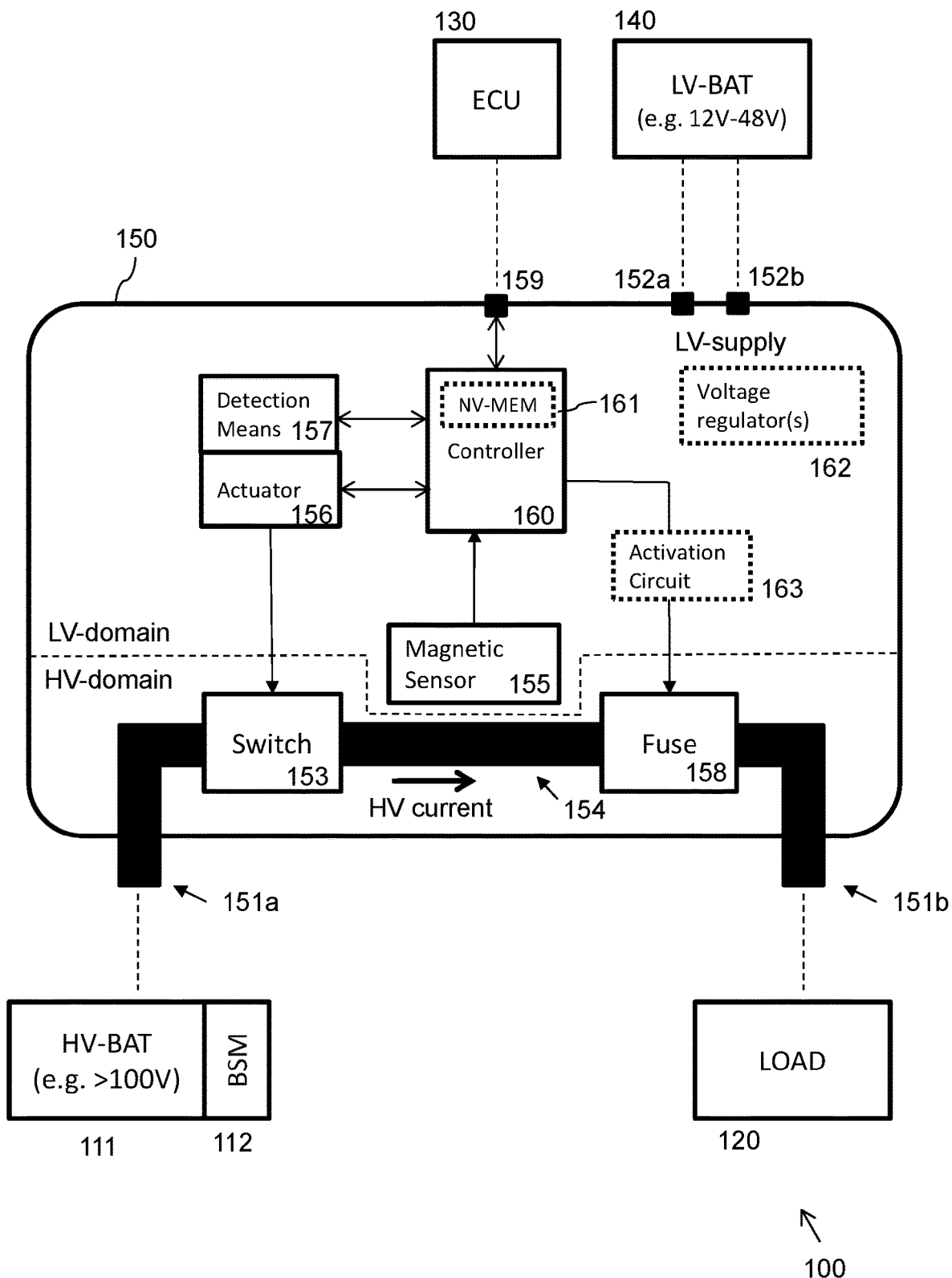
FIG. 1 shows a high-level block-diagram of a contactor, and an electrical power circuit comprising said contactor, proposed by the present invention.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the term "squib" refers to a miniature explosive device.

In this document, the expression "primary current" and "HV current" mean the same.

In this document, the expression "secondary current" and "current flowing through the actuator coil" mean the same.

In this document, the terms "the switch" or "the HV switch" or "primary switch" mean the same, and they refer to the switch (see switch 153, 253) connected between the first and second high power terminals, unless it is clear from the context that another switch is meant (e.g. switch 265 to energize the coil, or switch 263 to blow the fuse).

In this document, the terms "time period" or "time interval" or "time duration" mean the same.

The present invention relates to a contactor for selectively connecting/disconnecting a battery of an electric or hybrid vehicle to/from an electric load (e.g. an invertor, an electric motor, etc.). The present invention also relates to an electrical power circuit comprising a contactor, to methods of interrupting a current flowing through a contactor, and to an integrated circuit ideally suited for use in such a contactor.

US2014292109A1 discloses a contactor comprising an electro-mechanical switch, comprising a current sensor for measuring the current flowing through the contactor when the switch is closed. Whether the switch of this prior art contactor is opened or closed, is controlled by an external processor, often referred to as Electronic Control Unit (ECU).

However, in order to make a safe electric power system, it is not enough to have a contactor that can connect or disconnect the battery. Since the electric circuit of electrified vehicles may pose a real threat to its passengers, for example in the event of a collision, it is required for safety reasons, that a malfunctioning of the electrical power circuit should be detected rapidly, and the battery should be disconnected rapidly and reliably, e.g. sometimes within 5 ms, depending on the severity of the problem.

The present invention provides a contactor comprising: a first power terminal (e.g. connectable to a battery), and a second power terminal (e.g. connectable to an electrical load or to a charging circuit); and a sub-circuit electrically connected between the first power terminal and the second power terminal, and comprising at least the following three elements connected in series: an electrical conductor portion (e.g. a busbar portion), a primary switch comprising a movable part driven by an actuator, and a fuse (e.g. a pyro-fuse or a squib or the like), all of which are embedded in a housing of the contactor. The contactor further comprises: a magnetic sensor configured for measuring a (primary) current (also referred to herein as "HV current") flowing through the electrical conductor portion. The contactor further comprises a controller (e.g. a programmable microcontroller) communicatively connected to said magnetic sensor for measuring said primary current flowing through the electrical conductor portion. The controller is also operatively connected to said actuator for selectively opening and closing said switch. The contactor further comprises detection means for detecting (directly or indirectly, e.g. by determining an electrical property of the actuator) whether the primary switch is effectively open or closed.

According to an important aspect of the present invention, the controller is further configured (i) for measuring the primary current flowing through the electrical conductor portion, and for detecting an overcurrent condition, and in case an overcurrent condition is detected, (ii) for operating the actuator in order to (or in an attempt to) open the primary switch, and (iii) for detecting if the switch is actually open, and for blowing the fuse if the controller has detected that the switch is still closed (e.g. at a time interval Δt later than the moment of operating the actuator).

The primary switch is preferably capable of conducting a current of at least 100 Amps.

The time interval Δt may be a predefined time interval, or may be calculated as a function of the measured HV current (e.g. using a look-up table). The time period may be determined only once, after a measurement of the HV current, or may be dynamically adjusted or updated (based on ongoing HV current measurement values).

It is an advantage that the controller inside the contactor can determine whether the primary switch has actually opened or not, and thus can also detect that the switch did not open for whatever reason. This may happen for example in case the contacts of the switch are stuck or welded to the bus bar due to a current surge. In such a case, the controller will decide to blow the fuse to stop the current.

It is an advantage that the magnetic sensor can measure the HV current in a contactless manner. In this way, the contactor can have two voltage domains: a primary voltage domain, also referred to herein as "high voltage domain", HV domain, e.g. operating at 60 Volt or higher, e.g. 120 Volt or higher, or 200 Volt or higher; and a secondary voltage domain, also referred to herein as "low voltage domain", LV domain, e.g. operating at 48 Volt or less, e.g. 36 Volt or less, e.g. 24 Volt or less, e.g. 12 Volt or less. The magnetic sensor may be physically situated in the vicinity of the electrical conductor portion (e.g. the busbar portion) which is part of the HV domain, but operates in the LV domain, and is preferably also thermally isolated from the electrical conductor portion.

It is a major advantage that the contactor is able to detect (itself) whether the switch is effectively open or closed using said detection means.

It is an advantage that the contactor is able to detect autonomously that the switch is open or closed, and without having to rely (or to rely solely) on the measurement from the magnetic sensor (which may be corrupt or damaged), and/or without having to communicate with an external device (which communication channel may be broken and/or cause a delay), and/or without having to use or rely on a component outside of the contactor. This provides redundancy (at system level) and thus improves overall safety and reliability of the electrical power system in which this contactor is used.

It is a major advantage that, by being able and actually checking the switch status itself (inside the contactor) and/or by measuring the HV current itself (inside the contactor), and/or by determining an overcurrent condition itself (inside the contactor), the communication-loop or feedback-loop of certain events is shortened (as compared to a communication loop that involves one or more communication(s) with an external processor and/or components located outside of the contactor). This shortened loop in turn provides extra time during which an attempt can be made to open the switch without having to blow the fuse, which would damage the contactor in an irreversible way. Thus, thanks to the diagnostic features inside the contactor itself, the lifetime of the contactor may be increased by avoiding that the fuse is blown, e.g. in situations where the current is sufficiently small and/or there is sufficient time to safely open the switch.

Or stated in other words, it is an advantage of this contactor that (under certain conditions), it can first try to open the switch in a reversible manner, which may not be possible if valuable time was lost due to communication with external devices. By shortening the communication loop or decision loop, the probability of having to blow the fuse according to a safety criterion can be reduced.

It is an advantage that the "detection means" provides a way to analyse whether the switch is closed (which is a form of internal diagnostics) in a manner which is independent from the current measurement performed by the magnetic sensor. In this way the reliability of the contactor can be increased, and safety of an electrical power system in which this contactor is used, can be improved. Surprisingly, also the lifetime of the contactor can be increased, because without the detection means, the only safe option would be to blow the fuse. In contrast, the contactor of the present invention can make a better judgement to decide whether the current is small enough and/or there is sufficient time to try to open the switch, and if this succeeds, the fuse does not have to be blown.

It is an advantage that the fuse is also integrated in the contactor, because the housing of the contactor provides protection to the fuse and to the interconnection between the controller and the fuse. Thus, the risk that the fuse cannot be blown is reduced, and the safety of the overall system is further increased.

In another or a further embodiment, the controller may further comprise at least one (e.g. one or two) communication interface (e.g. a unidirectional or bidirectional serial bus interface) which is connectable to an external processor (e.g. to an external ECU, e.g. to an airbag ECU and/or to a Battery Management System controller) for sending and receiving information or instructions, e.g. for providing a signal indicative of the measured current, and/or for receiving one of the following commands: a command to open the switch (or to disconnect the battery), a command to close the switch (or to connect the battery), a command to blow the fuse.

In such embodiment, the opening of the switch can be triggered by one or more of the following events: (a) the detection of an overcurrent condition by the contactor itself, for example by comparing the measurement current with a threshold value, or by using a classical I2T (ampere-squared time seconds) technique; or (b) the receipt of a command to disconnect the battery, or open the switch from an external processor, for example from an airbag controller.

But other communication is also possible. For example, it is also possible that the contactor receives a command to unconditionally blow the fuse, or that the contactor reports an abnormal HV current, etc.

The present invention also provides a method of interrupting a current flowing through such a contactor, comprising the method steps (i) to (iii) described above. This method will be described in more detail, when discussing FIG. 4.

The present invention also provides an integrated circuit especially adapted for performing this method, when incorporated in such contactor. The integrated circuit preferably contains a non-volatile memory (e.g. flash) containing executable instructions for performing this method.

Referring now to the Figures.

FIG. 1 shows a high-level block-diagram of an electrical power circuit 100 comprising a battery 111 (e.g. a high-voltage battery providing a voltage of at least 100 Volt, or at least 200 V), connected to an electrical load 120 (e.g. an electrical two-phase motor or an electrical three-phase motor or a charging circuit) via a contactor 150. The electrical power circuit 100 may be incorporated in an electric vehicle (EV) or in a hybrid vehicle (HV), for example a car. In practice, of course, the electrical power circuit 100 may comprise further components, such as e.g. an inverter (not shown).

The contactor 150 of FIG. 1 comprises a first power terminal 151*a* which is connected or connectable to the battery 111, and a second power terminal 151*b* which is connected or connectable to the electrical load 120, but of course, the contactor 150 can also be used in other power circuits.

The contactor 150 comprises a sub-circuit in electrical connection between the first power terminal 151*a* and the second power terminal 151*b*, and comprising at least the following three elements connected in series: an electrical conductor portion 154 (e.g. a busbar), a switch 153 (e.g. an electromagnetic switch), and a fuse 158 (e.g. a pyro-fuse) or a squib. The electrical conductor portion 154 may be formed integral with the first power terminal 151*a* or may be formed integral with the second power terminal 151*b*, but that is not absolutely required.

If the fuse 158 is still intact and the switch 153 is closed, the electrical path formed between the first and second terminal 151*a*, 151*b* is conductive, i.e. the battery is connected to the electrical load. If the switch 153 is open and/or the fuse 158 is blown, the electrical path formed between the first and second terminal 151a, 151b is open, or stated in other words: the battery is disconnected from the electrical load.

The contactor 150 further comprises a controller 160, e.g. a programmable microcontroller, optionally with a non-volatile memory 161, a timer unit, a PWM-generator block, an analog-to-digital convertor (ADC), a communication interface (e.g. a serial communication interface, e.g. a CAN interface), a clock generator (e.g. crystal based or based on an RC oscillator), etc. The controller 160 is powered by a low supply voltage, e.g. a second battery, located outside of the contactor but connected thereto, and configured for providing a low voltage supply, e.g. of 48 Volt or less, or 36 Volt or less, or 24 Volt or less, e.g. of about 12 Volt. The low voltage is applied to the contactor via low voltage terminals 152a, 152b. The controller may be powered by this low supply voltage directly, or by a voltage derived therefrom, e.g. provided by one or more voltage regulators 162, if present. The controller 160 and the voltage regulator(s) 162, if present, may be mounted on a printed circuit board (PCB, not shown). The controller 160 may be part of an integrated circuit. A preferred embodiment of such an integrated circuit will be shown in FIG. 5.

The contactor 150 further comprises a housing (not explicitly shown, but schematically indicated by the rectangle 150 with rounded corners). As illustrated, the switch 153 and the fuse 158 and the controller 160 are situated inside the housing. This reduces the risk that the fuse cannot be blown in case of an emergency, e.g. after a collision. Importantly, the switch 153 and the fuse 158 operate in the high voltage domain, whereas the controller 160 (and other components which will be described further) operate in the low voltage domain which is galvanically separated from the high-voltage domain.

The contactor further comprises a magnetic sensor 155 configured for measuring (in a contactless manner) a current flowing through the electrical conductor portion 154. Magnetic current sensors are known in the art, and hence need not be explained in full detail here. Suffice it to say that they may comprise at least one magnetic sensor element, e.g. a horizontal Hall element, or a vertical Hall element oriented to measure the magnetic field created by the current when flowing through the electrical conductor portion 154, but other magnetic sensor structures may also be used, for example comprising a magneto-resistive (MR) element, or at least two Hall elements, spaced apart and oriented in a same direction, allowing to determine a magnetic field gradient. Using a difference signal or a gradient signal allows to determine the current flowing through the electrical conductor portion 154 with a reduced influence from an external disturbance field, thus with improved accuracy. The magnetic sensor may comprise a magnetic flux concentrator.

The value obtained from the magnetic sensor element or from the magnetic sensor structure comprising that magnetic sensor element, e.g. a Wheatstone-bridge, may be amplified (e.g. using a differential amplifier) and digitized (e.g. using an analog-to-digital convertor ADC embedded in the controller 160), in manners known in the art. The current values, or a subset of the current values may be transmitted via a communication bus, e.g. a CAN-interface, to an external processor, e.g. to an external ECU.

The magnetic sensor 155 may be embedded in the same silicon substrate as the controller 160, or may be located outside of the controller 160, but electrically connected thereto. Preferably the distance between the magnetic sensor 155 and the electrical conductor portion 154 is relatively small (e.g. smaller than 10 mm), in order for the signal to be sufficiently large. In certain embodiments the contactor 150 may have a plurality of magnetic sensor elements located at several distances from the electrical conductor portion 154. This allows to measure the current with a higher signal-to-noise ratio (SNR).

The switch 153 comprises a movable part (not shown) driven by an actuator 156. The actuator 156 may be an electromagnetic actuator comprising a coil (schematically illustrated in FIG. 2) and a movable element arranged inside said coil (not shown). The actuator 156 may also comprise a mechanical spring (not shown) for biasing the switch 153 to a Normal Open (NO) condition or a Normal Closed (NC) condition. The movable element can for example be controlled by sending a secondary current (LV current) through the coil (as illustrated for example in FIG. 2). Such switches 153 and actuators 156 are well known in the art, and hence need not be explained in more detail herein.

According to an important aspect of the present invention, the actuator 156 of the contactor 150 of the present invention contains detection means 157 capable of detecting (directly or indirectly) whether the switch 153 is actually open or closed. Two possible implementations are described next, but the present invention is not limited thereto, and other detection means are also envisioned. In a first implementation, the actuator 156 comprises a coil and a shunt resistor connected in series with the coil, and the voltage over the shunt resistor is measured, and the voltage over the coil is measured, and digitized, and the voltage signals are analysed (e.g. in software) in the controller 160. In a second implementation, the actuator 156 comprises a coil and a magnetic positioning means, e.g. a linear position detector, or a magnetic presence detector, also known as a "proximity switch". The proximity switch may comprise a transmitter coil (for transmitting an RF signal) and a receiver coil (for receiving said RF signal), and a so called "target" may be connected to the movable element, for modulating the received signal. The controller 160 may analyse the receiver signal to determine the position of the target and thus the condition of the switch 153.

A major advantage of adding a detection means 157 inside the contactor 150 is that the controller 160 can use it as a feedback means to determine whether or not the switch 153 is actually open or closed ("closed loop control"), independent of the signal obtained from the magnetic sensor 155, and without having to rely on a signal obtained from an external processor. Since the detection means is also incorporated inside the housing, the risk of a malfunction e.g. due to a signal disturbance or a broken communication link is highly reduced.

It is noted that the detection means 157 described herein can also be used for a safety check (at system level), e.g. by testing whether the primary switch is stuck-open, or stuck-closed. This is possible even if two contactors according to the present invention are connected in series between a battery and an electrical load, and one of the primary switches thereof is open. Even in that case, it is possible to check whether the primary switch of the other contactor is open or closed, not by measuring the primary current (which is zero), but by using the detection means 157.

The controller 160 also has an output port (e.g. OUT2 in FIG. 5) which can trigger the fuse 158, e.g. directly, or via an optional activation circuit 163.

Having described the various components of the contactor 150, the next paragraphs will explain how the contactor 150 proposed by the present invention may work.

As can be appreciated from FIG. 1, during operation, the HV-battery 111 provides a voltage of at least 100 Volt, and the low voltage battery 140 provides a voltage of at most 48 Volt, and the external controller 130 (e.g. ECU) may provide a signal to the controller 160 of the contactor 150 to connect the HV battery, or to close the switch 153 (or the like). Upon receipt of such command, the controller 160 will operate the actuator 156 (e.g. by energizing a coil) in order to close the switch 153, thereby allowing primary current to flow through the electrical conductor portion 154. Optionally, the controller 160 may first perform internal safety checks (e.g. calculate a checksum of a portion of the non-volatile memory, or diagnose the coil), upon receipt of such command, and operate the actuator 156 if the safety checks are successful. Actual control of the motor is done outside of the contactor 150 and falls outside the scope of the present invention.

The external processor 130 may request the contactor 150 to measure the (primary) current flowing through the electrical conductor portion 154. The controller 160 will obtain a signal (e.g. a voltage signal) from the magnetic sensor 155, and will convert it into a current signal in manners known per se in the art (e.g. by amplifying and digitizing and multiplying with a constant K). The constant K may be hardcoded, or may be determined during a calibration step, and subsequently stored in the non-volatile memory 161 of the contactor 150. Preferably the measured signal is also temperature corrected in known manners. To this end, the contactor may further comprise a temperature sensor, which may be arranged in the vicinity of the magnetic sensor. In the integrated circuit of FIG. 5 both the magnetic sensor and the temperature sensor are integrated in the integrated circuit, but the present invention is not limited thereto. The (optionally temperature corrected) current value may be transmitted via an output port or via a serial bus interface, e.g. a CAN bus to the external processor 130. The non-volatile memory 161 may be incorporated inside the controller 160, e.g. in the form of flash, or may be a separate component connected to the controller 160.

According to an important aspect of the present invention, the controller 160 of the contactor 150 is also configured for measuring the HV current autonomously (even without receiving a command from an external processor to do so), and for detecting an overcurrent condition itself and/or to perform internal diagnostics. This may be based on a simple comparison of the measured current with a predefined threshold value I1 (e.g. a parameter which is stored in a non-volatile memory 161, or may be based on a classical I2T (ampere squared time) technique, or a combination of both. This will be further discussed in relation to FIG. 3. As explained above, if the controller has detected an overcurrent condition, it will first try to open the switch, and if the switch does not open, to blow the fuse, as described in steps (i) to (iii) above.

The external processor 130 may request the contactor 150 to disconnect from the HV battery (or to open the switch 153). A classical contactor would simply operate the actuator 156 so as to open the switch 153 (in an open-loop manner) but would not know if the switch is actually open. The external processor may request a new current measurement, and if the external processor notices that the current does not drop, may send a new request to the contactor to open the switch 153, which may fail again, until eventually the external processor would instruct another component to blow a fuse. This is not ideal, may require too much time, which in turn may lead to dangerous situations.

As another example, suppose that the external processor 130 is an airbag ECU, and a collision occurs causing an airbag to be activated. Upon such an event the airbag ECU may send a command to unconditionally blow the fuse, as a safety precaution.

The inventors of the present invention realized that these prior art solutions are not ideal, and there may be situations where it is possible to open the switch instead of blowing the fuse, provided that it would be guaranteed that the switch is effectively opened. If this were possible, the lifetime of the contactor could be prolonged, provided that safety can be guaranteed. This is an important insight underlying the present invention.

The contactor 150 proposed herein will make sure that the HV current will be interrupted but will only blow the fuse when absolutely required. More specifically, when the controller 160 receives a command from an external processor to "interrupt the current flow" (or to "disconnect the battery" or "to open the switch" or the like), it will first try to open the switch, and if the attempt fails or if there is insufficient time, it will autonomously blow the fuse. This will be explained in more detail when discussing the method of FIG. 4.

While not explicitly shown in FIG. 1, the contactor 150 may optionally further comprise a magnetic shielding for reducing a magnetic disturbance caused by the actuator coil (if present) on the magnetic sensor 155.

The controller 160 and/or the printed circuit board on which it may be mounted, is electrically isolated (galvanically separated) from the HV domain, in particular from the electrical conductor portion 154 (e.g. busbar portion), and is preferably also thermally isolated from the HV domain.

The contactor may measure the HV current at a first, relatively high sampling rate (e.g. at a rate from 1 kHz to 10 kHz) for diagnostic purposes, and a subsampled version thereof may be provided to an external ECU, e.g. to a Battery Management System controller (e.g. at a rate from 100 Hz to 500 Hz).

Figure 2:
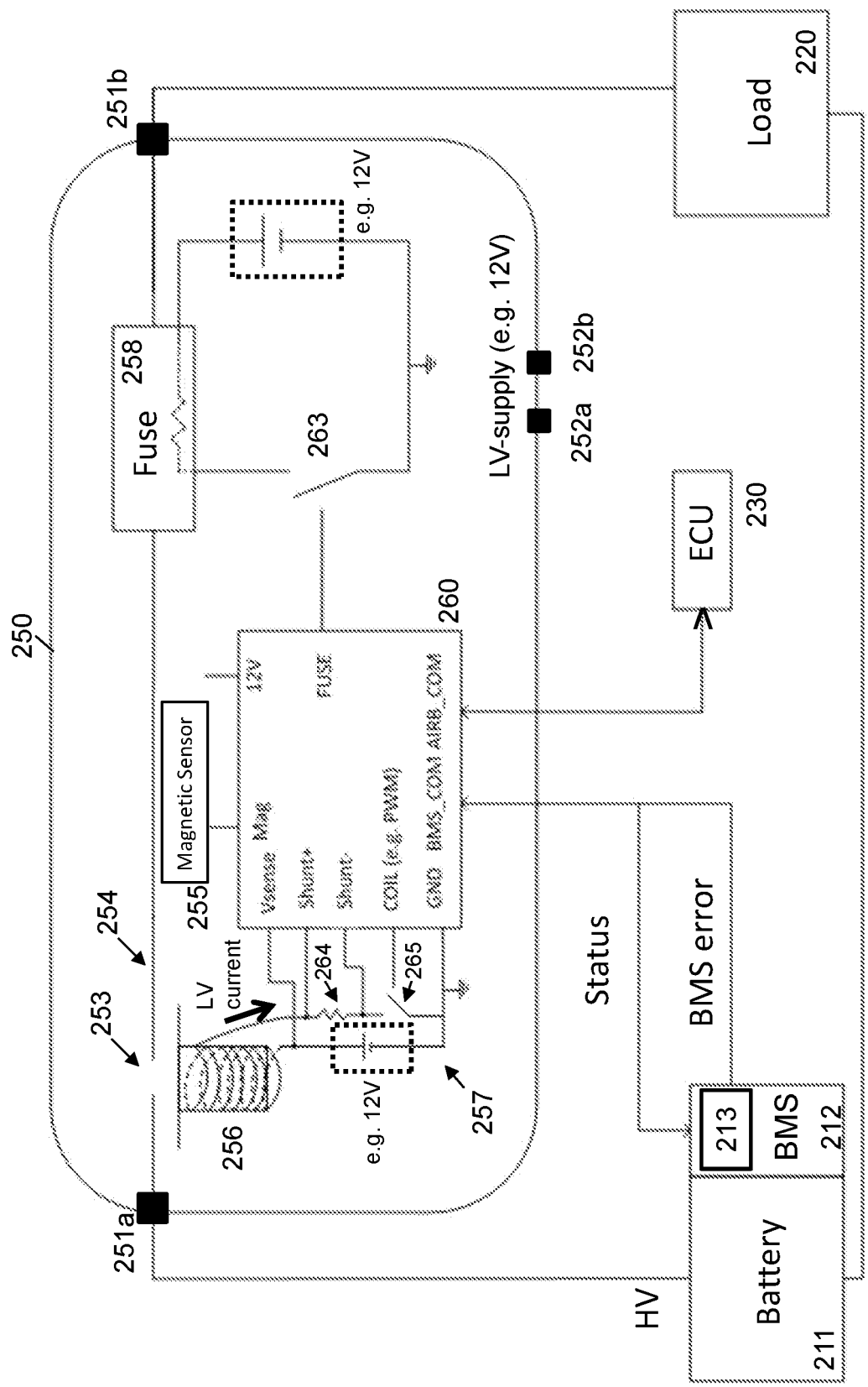
FIG. 2 shows another block-diagram of a contactor, and an electrical power circuit comprising said contactor, proposed by the present invention, which can be seen as a variant or a specific implementation of the contactor and the circuit shown in FIG. 1.

FIG. 2 shows a block-diagram of a contactor 250 and an electrical power circuit 200 comprising at least one such contactor, which can be regarded as a variant of, or a specific implementation of the contactor 150 and the electrical power circuit 100 of FIG. 1. Like elements are indicated by like reference numerals. The main differences between the block-diagram of FIG. 2 and that of FIG. 1 are the following: the actuator 256 of the contactor 250 shown in FIG. 2 is an electromagnet comprising a coil; the detection means 257 of the contactor 250 comprises a shunt resistor 264; the detection of whether the switch is open or closed may be performed by applying a known waveform, e.g. a step function (i.e. a waveform that suddenly changes from logical "0" to logical "1") or a pulse-width-modulated signal (PWM) to the coil, and by measuring and sampling the (first) voltage over the shunt resistor 264, and by optionally also measuring and sampling the (second) voltage over the coil (or voltage over the series connection of the coil and the shunt resistor, or voltage over the second switch 265 (e.g. a transistor), from which the voltage over the coil can be derived), and by analysing the first and the second voltage waveform (e.g. by looking at some parameters such as time constant, or shape of a waveform). This analysis may be based on a model of an RLC circuit with a movable element; additionally, the detection of whether the switch is open or closed may also take into account the value obtained from the magnetic sensor (indicative for the HV current flowing through the electrical conductor portion), in case this current is different from zero; the controller 260 of the contactor 250 shown in FIG. 2 has at least one, e.g. two communication ports, e.g. two serial communication ports. In the specific example shown in FIG. 2, a first communication port is or can be used for communicating with a general ECU or an airbag ECU 230, and a second communication port is or can be used for communicating with the controller 213 of a Battery Management System (BMS) 212; the controller 260 is preferably incorporated in an integrated circuit or a semiconductor chip, e.g. a packaged semiconductor device. This chip may be configured for being powered directly or indirectly by a 5 Volt supply, or for being powered directly or indirectly by a 12 Volt supply. The magnetic sensor 255 may be or may comprise at least one Hall element or at least one magneto-resistive (MR) element, which is/are preferably integrated in the integrated circuit or inside the same packaged device; the contactor 250 may further comprise a "fuse activation circuit" 263, schematically illustrated here by means of a switch symbol. In practice this may for example be a transistor or a dedicated fuse driver chip (e.g. known as "squib driver");

The controller 260 may be mounted on a printed circuit board (not shown), which PCB is mounted inside the contactor 250, and is electrically and preferably also thermally isolated from the HV domain.

In a variant of FIG. 2, the electric power circuit has at least two contactors, for example two contactors connected in series or two contactors connected in parallel, or one contactor in the path from the battery to the load, and another contactor in the return-path from the load to the battery.

Figure 3:
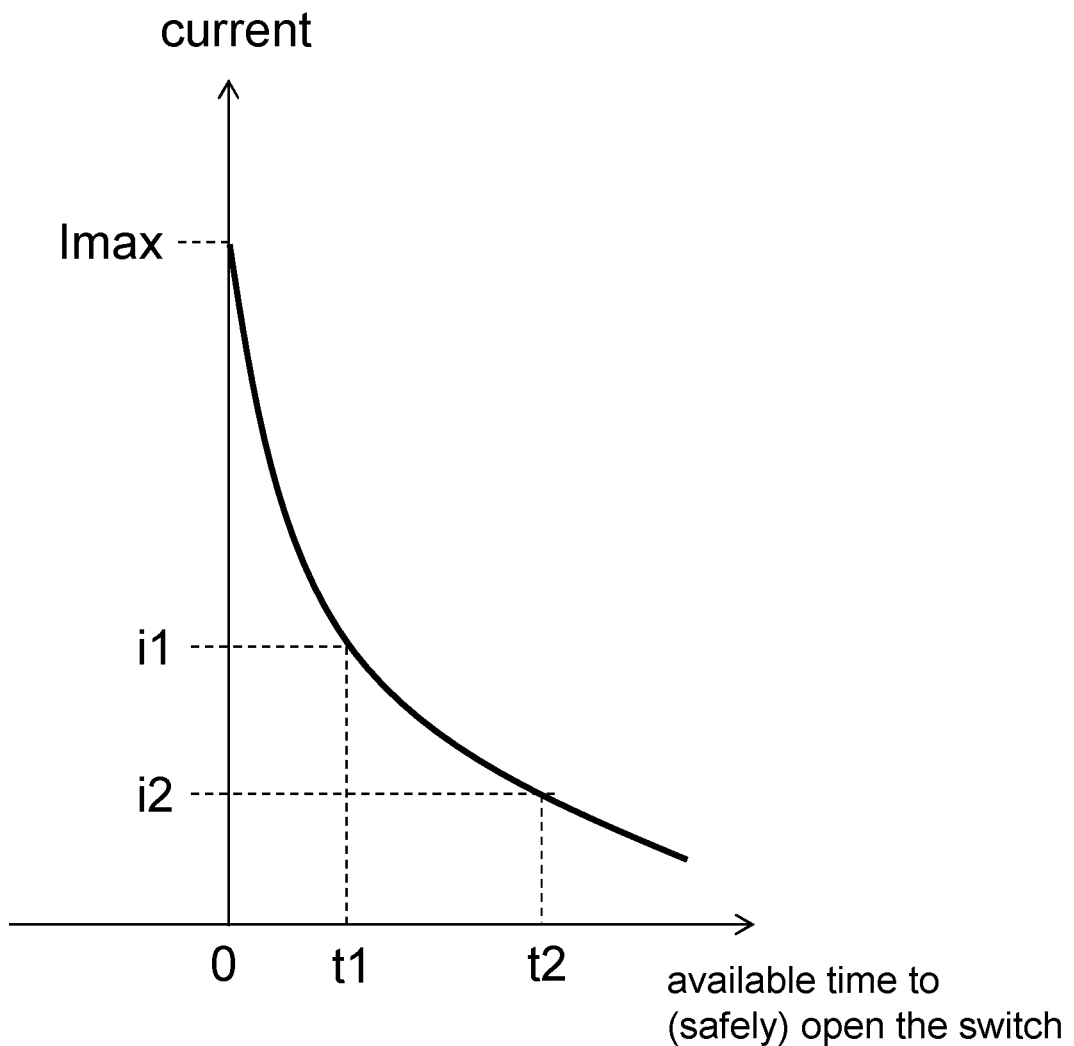
FIG. 3 shows a typical time-current curve which can be used in embodiments of the present invention, to determine how much time is available to open the switch as a function of the measured current.

FIG. 3 shows an exemplary "time-current curve" which can be used in embodiments of the present invention, for example in order to determine how much time Δtav is available to try to open the switch 153, 253 as a function of the measured HV current flowing through the electrical conductor portion 154, 254. Such a graph may be specific for a particular vehicle type, may depend on busbar network dimensions, thermal limitation of the powertrain modules, etc. The graph may be considered as a given for a particular project. Values of this graph may be stored in the non-volatile memory of the controller in any suitable manner (e.g. as a table, or as a piece-wise linear curve, or as a set of parameters of an algebraic expression, or in any other suitable way).

As described above, the controller 160, 260 of the contactor 150, 250 can measure the HV current flowing through the electrical conductor portion 154, 254 upon request, or autonomously. Depending on the specific implementation of the switch and/or the actuator and/or the low voltage supply, it typically takes a finite amount of time Δtreq (required time) to open the switch under normal circumstances, (i.e. assuming that the movable part is not stuck), say for example about 90 ms for a particular type of switch, but of course the present invention is not limited hereto.

If the controller measures the HV current, and if this measured current is larger than the value Imax (see FIG. 3), then the controller knows that there is no time to even try to open the switch, and hence the controller will immediately blow the fuse. If the measured current is smaller than Imax, a maximum time that this current is allowed to flow is shown by this graph. For example, if the measured current is equal to i1, the maximum time is t1. If the maximum allowed time is smaller than the time typically required for opening the switch, or for performing safety checks and opening the switch, (depending on the implementation), (e.g. the above mentioned 90 ms), then again, it is not worth to even try to open the switch, and the controller will immediately blow the fuse. However, if the measured HV current is equal to i2, the maximum time is t2, and if this time is larger than the time typically required to open the switch, optionally preceded with said safety checks, (e.g. more than the above mentioned 90 ms), then it does make sense to first try to open the switch in a reversible manner, using the actuator, and only if it turns out that the switch cannot be opened, or cannot be opened within the expected time period, the controller will decide to blow the fuse after all. In this way, the controller of the present invention is capable of guaranteeing safety, while at the same time maximizing the lifetime of the contactor.

Of course, the value of 90 ms is only an example, and other switches and actuators can also be used, but the same principles apply.

Figure 4A:
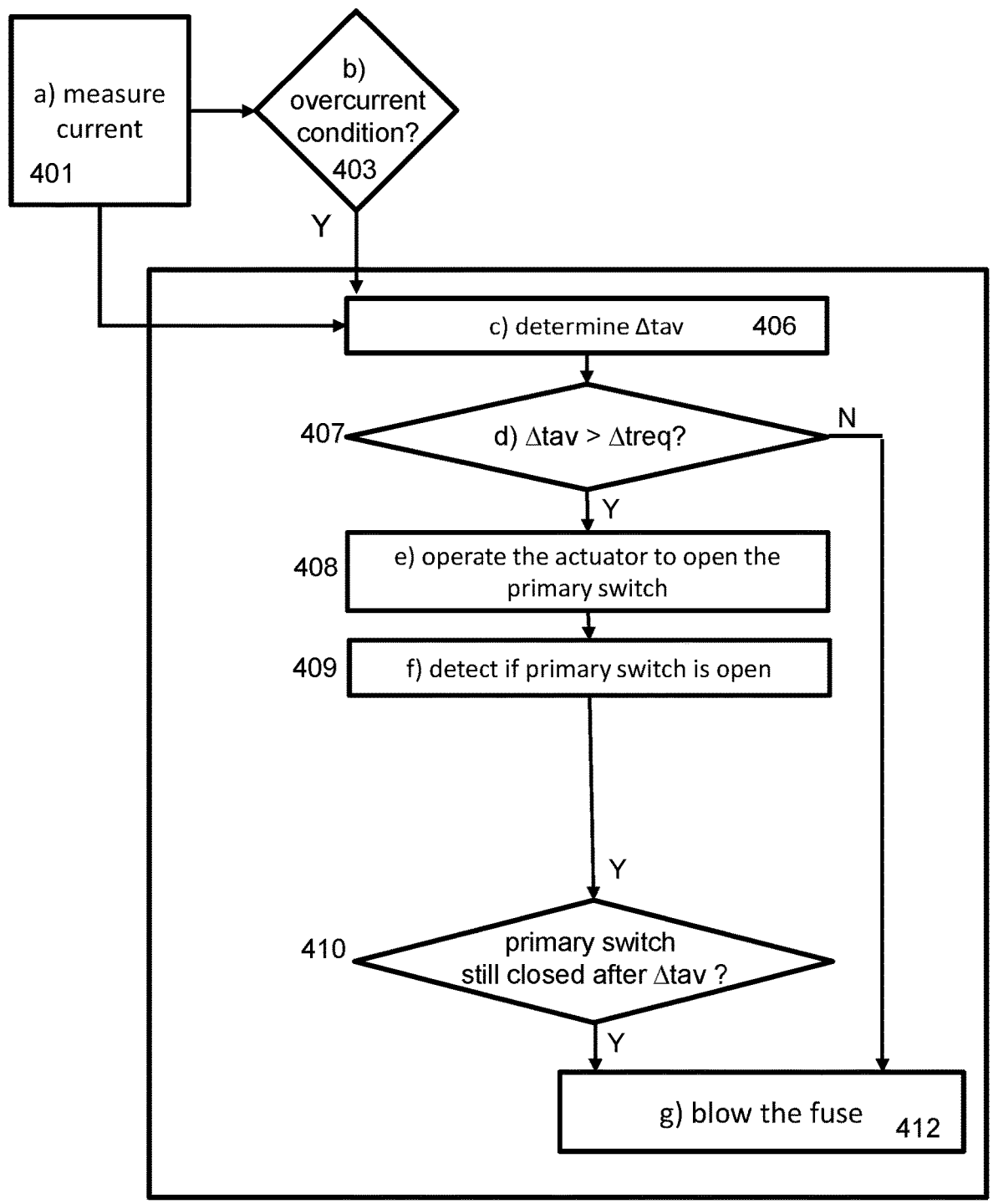
FIG. 4(a) to FIG. 4(d) show flow-charts of methods according to embodiments of the present invention, which can be performed by the controller of a contactor shown in FIG. 1 or FIG. 2.

FIG. 4(a) shows a flow-chart of a method 400 of interrupting a current flowing through a contactor 150, 250 like the one shown in FIG. 1 or FIG. 2. The method 400 comprises the following steps:

a) measuring 401 at least once, or repeatedly a current flowing through the electrical conductor portion 154, 254 of the contactor 150, 250;

b) detecting 403 an overcurrent condition (based on the measured current value or values);

c) determining 406 an available amount of time Δtav to open the primary switch 153, 253 and optionally perform safety checks based on the measured current value(s), e.g. taking into account a time typically required to open the switch and/or to perform safety checks, e.g. taking into account a current-versus-time table or curve or mathematical formula;

d) comparing 407 the available time Δtav and a typical required time Δtreq;
  i) and if the available time Δtav is smaller than the required time Δtreq, continuing with step g);
  ii) otherwise continuing with step e);

e) operating 408 the actuator 156, 256 in order to (or in an attempt to) open the switch 153, 253;

f) detecting 409, using the detection means 157, 257 whether the switch 153, 253 is effectively open within the available time period Δtav;
  i) and in case the switch 153, 253 is still closed after the available time period Δtav, continuing with step g);

g) blowing the fuse 412.

It is an advantage that the controller performs step 403 (determining an overcurrent condition), because this may automatically trigger the opening of the switch and/or the blowing of the fuse sooner, (e.g. before an external processor has detected that something is wrong), thereby avoiding or reducing the risk to damage the vehicle and/or endanger the life of its occupants. A faster detection also increases the probability to keep the fuse alive.

The method 400 describes a relative simple procedure, and shows the most important steps proposed by the present invention. But many variants of this method are possible.

In a variant of FIG. 4(a), not shown, step c) and d) are omitted, and the branch to blow the fused is omitted, and the time-out value of step 410 is predefined (e.g. hardcoded). In such an embodiment, the contactor would measure the current in step a), and in case an overcurrent is detected in step b), the contactor will first try to open the primary switch in steps e) and f) and will evaluate if the primary switch is actually open after said predefined time-out period. And in case the primary switch is not open, the contactor will blow the fuse.

Figure 4B:
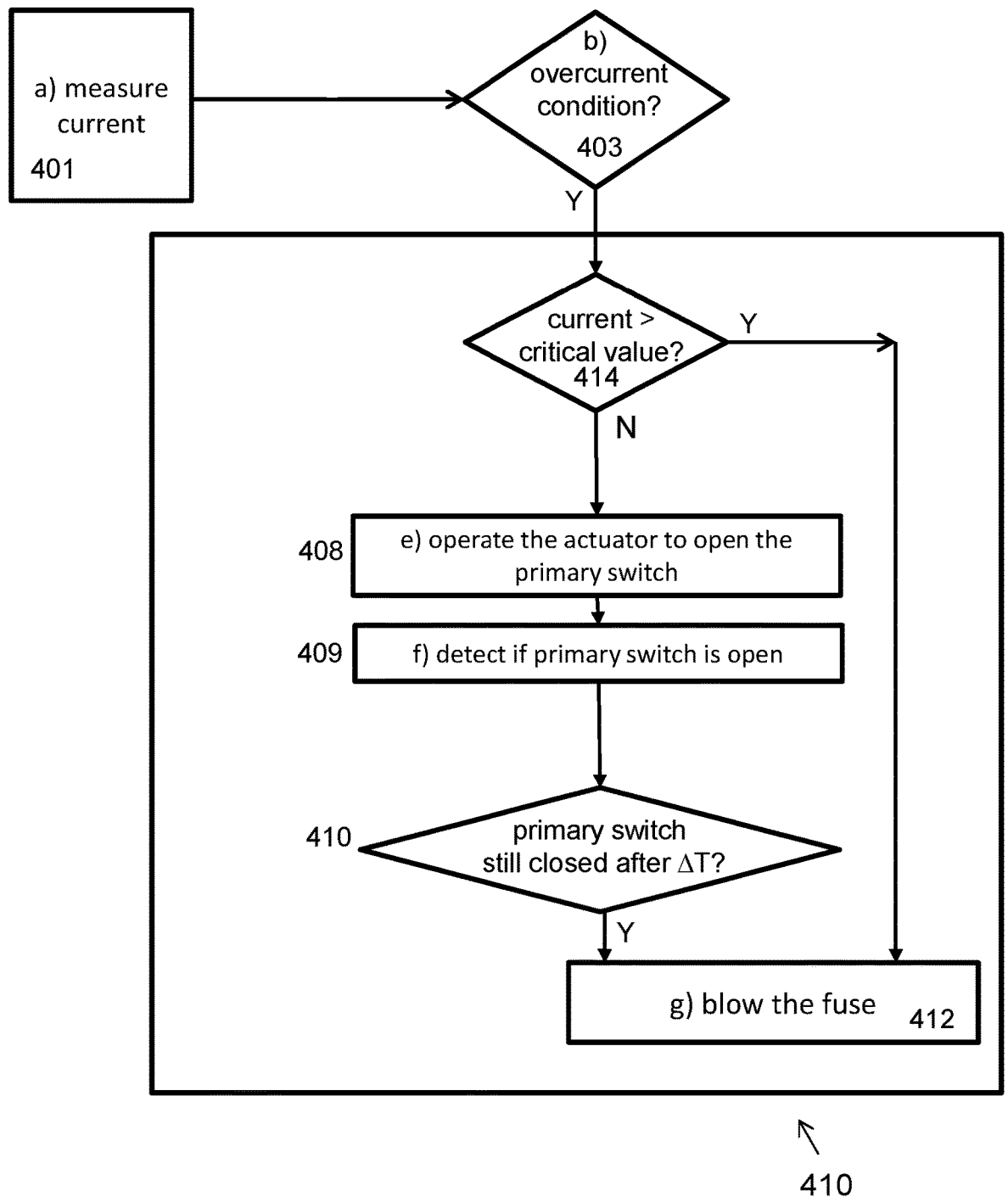

FIG. 4(b) shows a flow chart of a method 410 which is a further variant of the one described here above, wherein, after detecting that an overcurrent condition has occurred (or as part thereof), the contactor would test (in step 414) if the measured primary current is larger than a predefined (critical) threshold value, and if that is the case, the contactor will blow the fuse (in step g). Otherwise, the contactor will first try to open the primary switch in steps e) and f) and will evaluate if the primary switch is actually open after a predefined time-out period ΔT (in step 410). And in case the primary switch is not open, the contactor will blow the fuse (in step g).

Figure 4C:
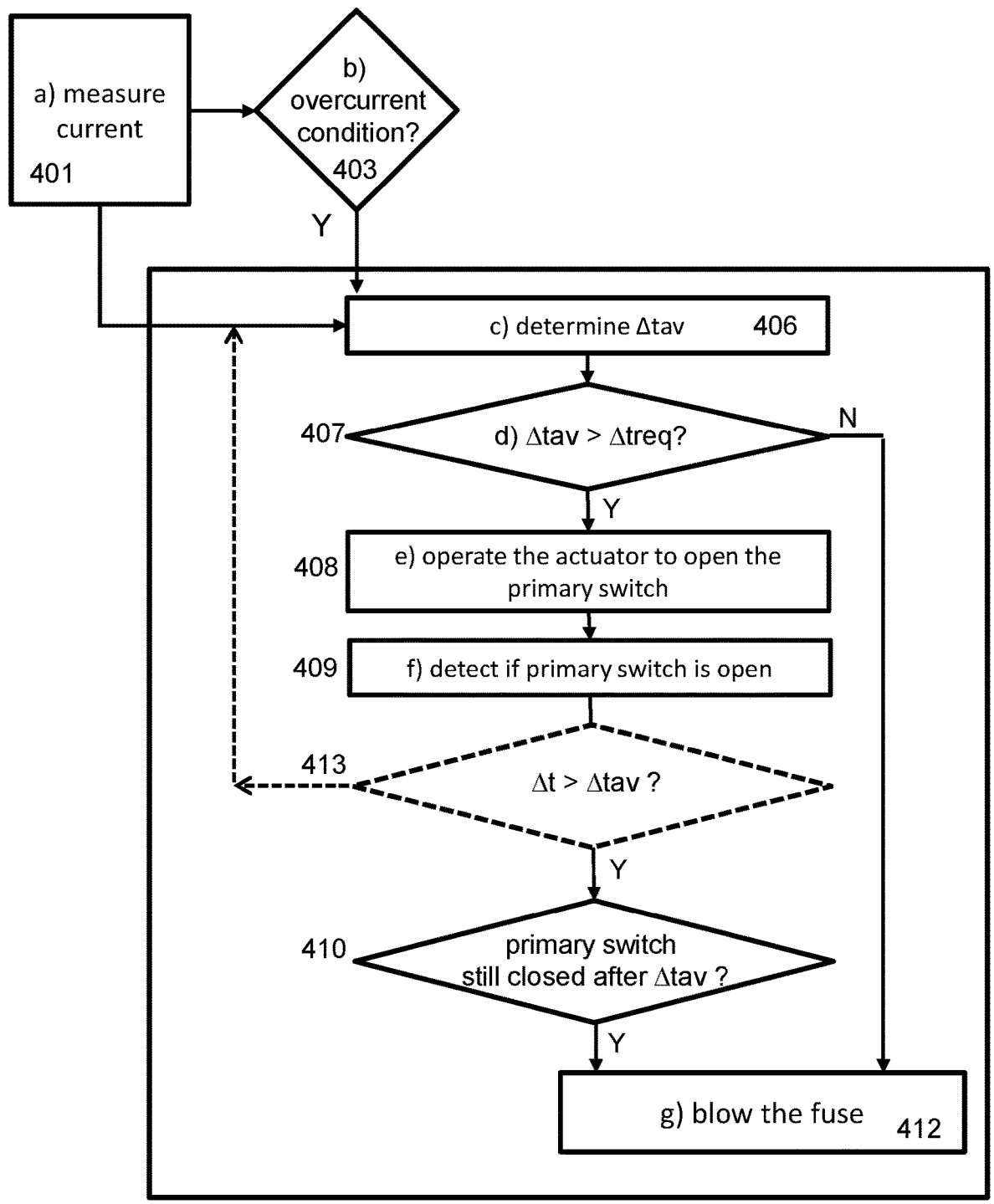

FIG. 4(c) shows a flow-chart of a method 420 of interrupting a current flowing through a contactor 150, 250, which can be seen as another variant of the method 400 of FIG. 4(a). The most important difference between the method 420 of FIG. 4(c) and the method 400 of FIG. 4(a) is that it contains a step 413 in which it is tested whether the time lapsed since the overcurrent situation was detected in step b) is larger than the available time Δtav, and if that is not the case, to go back to step c) and update the available time Δtav.

It is an advantage of this method 410 that the available time Δtav is updated at least once, e.g. is dynamically updated, taking into account recent measurements of the primary current (in step a), thus effectively taking into account variations of the primary current while trying to open the switch.

Figure 4D:
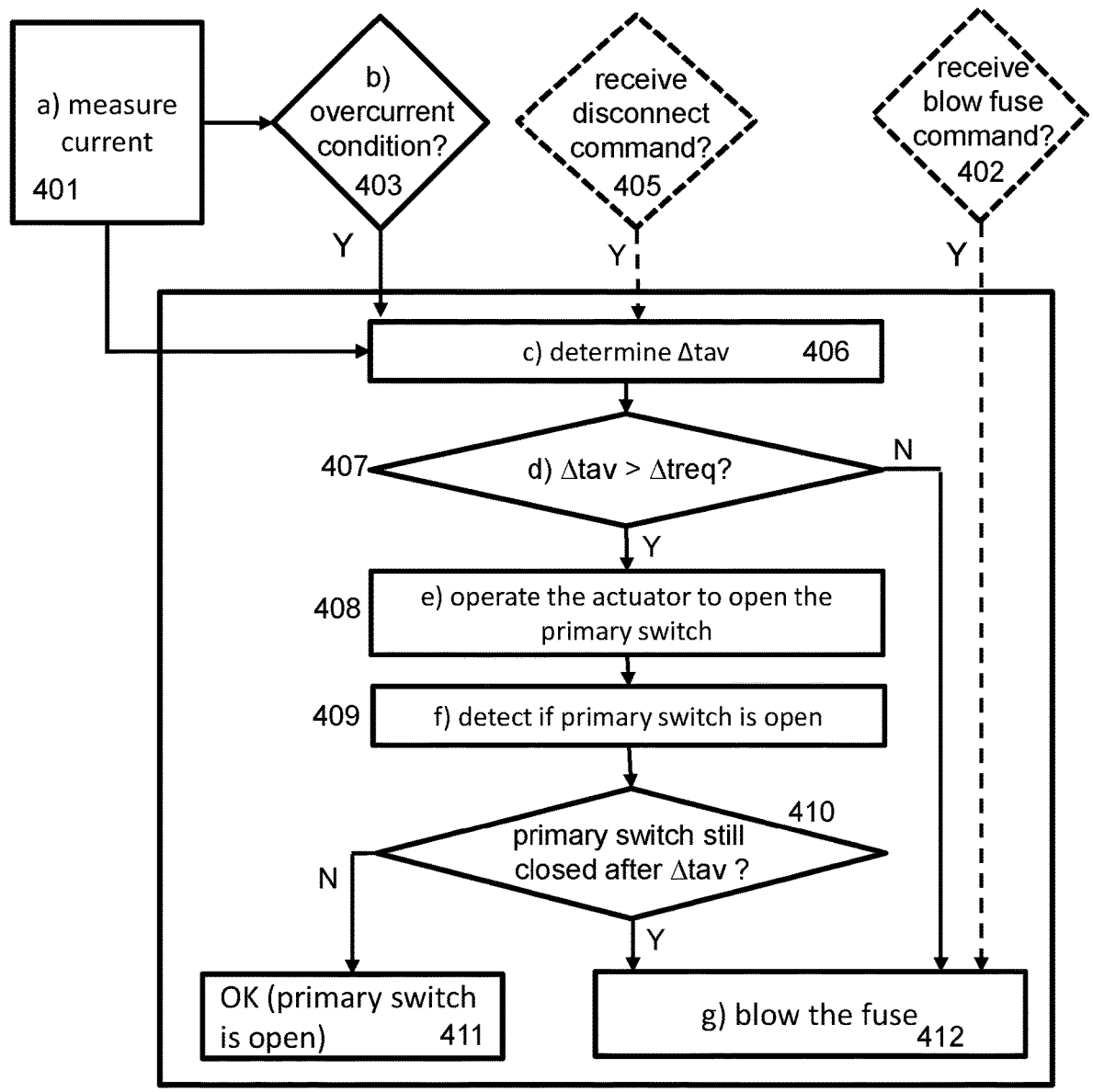

FIG. 4(d) shows a flow-chart of a method 430 of interrupting a current flowing through a contactor 150, 250, which can be seen as another variant of the method 400 of FIG. 4(a). The most important differences between the method 430 of FIG. 4(d) and the method 400 of FIG. 4(a) are: that the attempt to open the switch is not only triggered by an overcurrent detection of the controller itself, but can also be triggered by a command to open the switch (or to disconnect the battery or the like) coming from a controller or a processor or an ECU located outside of the contactor; and that the controller of the contactor may also blow the fuse after receiving 405 a command to unconditionally blow the fuse, coming from a controller or a processor or an ECU located outside of the contactor.

The steps 401, 403, 405 and/or 402 may be performed in parallel, or semi-parallel, e.g. in a time-multiplexed manner.

FIG. 4(a) to FIG. 4(d) show four examples of methods which may be performed by the controller of the contactor proposed herein, but of course, in practice, other variants are also possible.

As mentioned above, testing or evaluating or assessing 409 whether the primary switch 153, 253 is actually open can be performed indirectly, by evaluating the state of the actuator. The state of the actuator can for example be determined by measuring and analysing a current waveform of the actuator (e.g. using a shunt resistor) to detect whether the movable element has actually moved or not. The state of the actuator can also be determined by using a position sensor (e.g. a magnetic position sensor, or a proximity sensor), or in any other suitable way.

Step 409 of "detecting whether the switch is open, may comprise measuring the voltage over the shunt resistor and/or the voltage over the coil (or the coil in series with the switch, or the coil in series with the shunt), and may thus involve multiple voltage measurements. These two voltages may be measured and sampled using a time-multiplexing scheme, and a single or two analog-to-digital convertor (ADC).

Of course, the controller 160, 260 of the contactor 150, 250 may also perform other tasks (not shown in FIG. 4(a) to FIG. 4(d), such as for example:

periodically transmitting the measured current values to an external processor, e.g. to a Battery Disconnect Unit (BDU), sometimes also referred to as a Battery Junction Box (BJB) or a Power Relay Assembly (PRA). As mentioned above, the rate at which current values are transmitted may be smaller than the rate at which the primary current is measured and used internally for evaluating an overcurrent condition.

Figure 5:
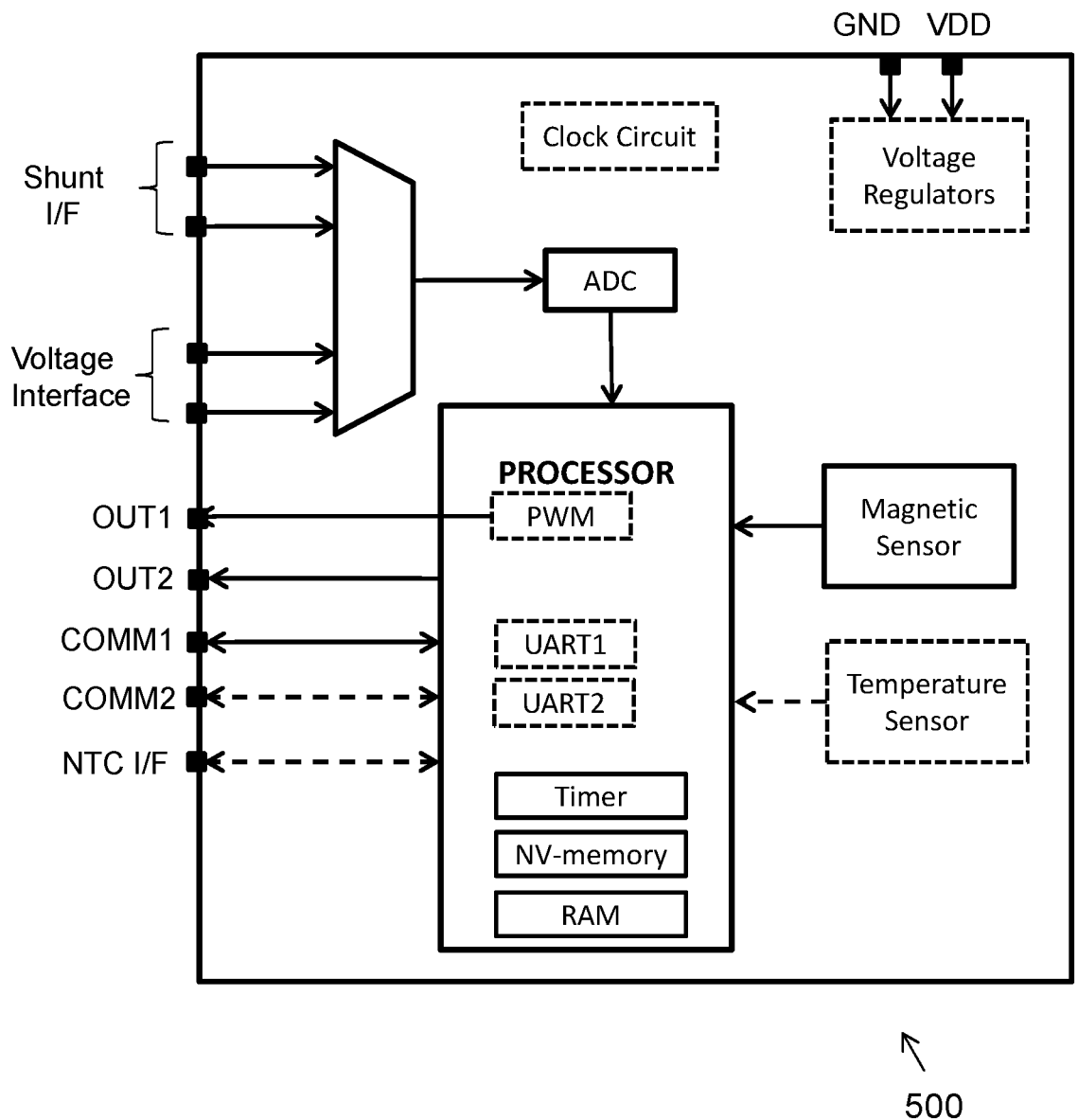
FIG. 5 shows a block-diagram of an integrated circuit comprising a processor, which can be used in embodiments of the present invention.

FIG. 5 shows a block-diagram of an integrated circuit 500 as can be used in embodiments of the present invention.

The integrated circuit 500 of FIG. 5 comprises:
a controller in the form of a programmable processor, e.g. a programmable microcontroller or digital signal processor (DSP);
a magnetic sensor, e.g. comprising one or more Horizontal Hall elements, one or more vertical Hall elements, a circuit comprising a magneto-resistive (MR) element, optionally an integrated magnetic flux concentrator (IMC);
a shunt interface for sensing a voltage over a shunt resistor connectable to the integrated circuit, from which voltage a secondary current (or LV current) can be derived;
a voltage sensing interface for sensing a voltage over a coil connectable to the integrated circuit (e.g. as shown in FIG. 2);
a first output OUT1 for driving an actuator 156, 256, optionally using a PWM-signal;
a second output OUT2 for activating or triggering a fuse driver, e.g. a pyro-fuse driver;
a non-volatile memory comprising executable instructions for the controller, for:
  i) measuring 401 a primary current using said magnetic sensor, and for detecting 403 if an overcurrent condition occurs; and if an overcurrent condition is detected, continuing with step ii) otherwise repeating step i);
  ii) asserting the first output OUT1 for operating 408 the actuator to open a primary switch 153; 253;
  iii) detecting 409 if the primary switch 153; 253 is effectively open by analysing signals obtained from the shunt interface and signals obtained from the voltage sensing interface; and if it is detected that the primary switch is still closed after a time interval (e.g. Δtav), asserting the second output OUT2 for blowing 412 the fuse 158; 258.

The non-volatile memory may also contain data corresponding to a current versus time curve.

The "shunt interface", and the "voltage sensing interface" and the "supply voltage interface" are shown with 6 terminals (or pins), but that is not absolutely required, since some signals can be shared with the "ground terminal", in manners known in the art.

The integrated circuit 500 may further comprise one or more of the following: a clock generator (e.g. crystal based or based on an RC oscillator); a voltage-regulator; a timer unit; an analog multiplexer; a pulse-width modulation (PWM) generator block, e.g. connectable to the first output OUT1; a digital communication interface for receiving instructions from an external processor; an analog-to-digital converter (ADC) for digitizing a signal obtained from the shunt interface, and configured for digitizing a signal obtained from the voltage sensing interface; a 12 Volt supply input; a timer unit; an NTC interface (Negative Temperature Coefficient component) to measure an external temperature; a temperature sensor for measuring or estimating a temperature of the magnetic sensor.

Figure 6:
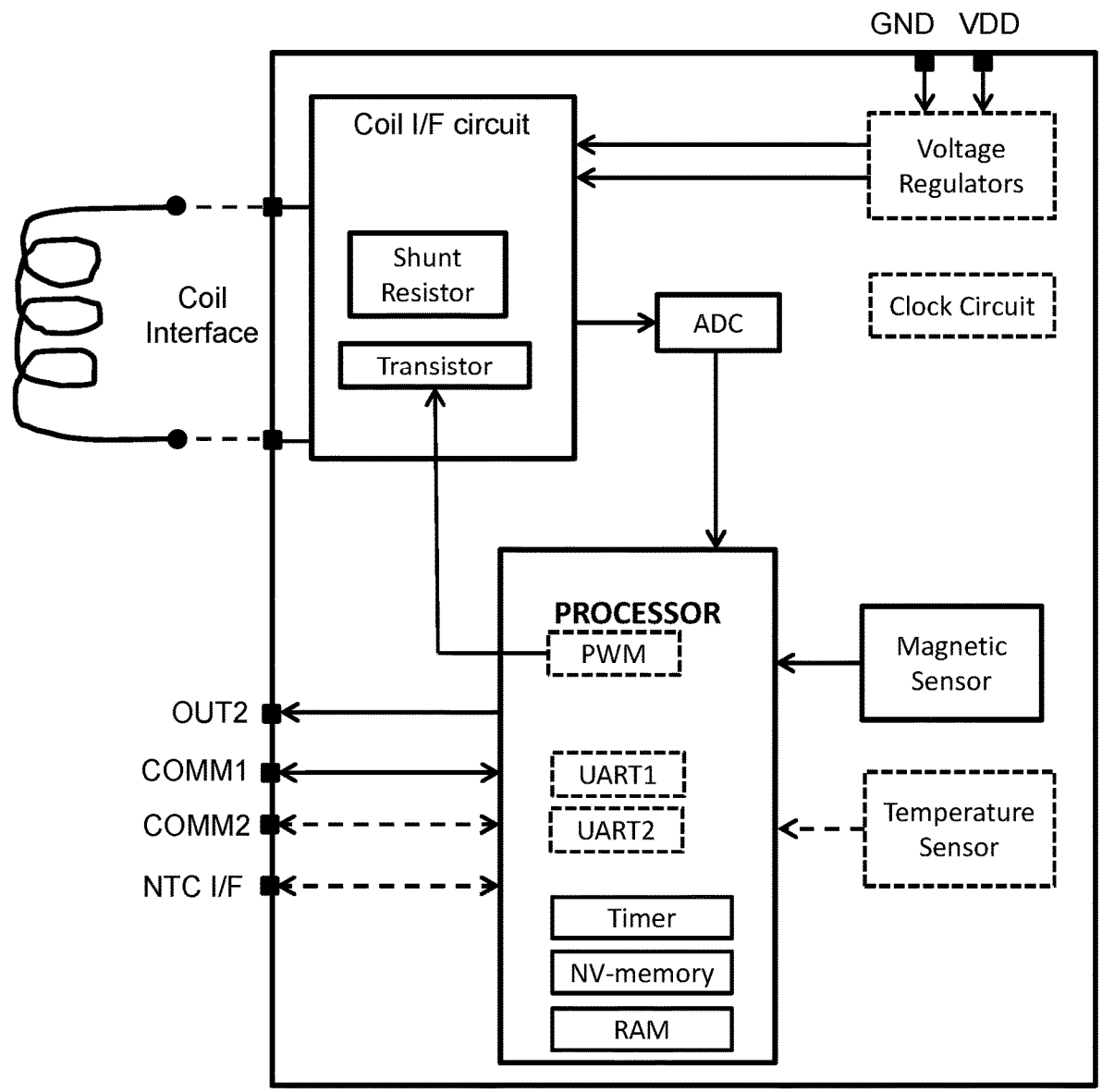
FIG. 6 shows a block-diagram of another integrated circuit comprising a processor, which can be used in embodiments of the present invention.

FIG. 6 shows a block-diagram of an integrated circuit 600 which can be seen as a variant of the integrated circuit 500 of FIG. 5, with a coil interface circuit comprising an integrated shunt resistor, and an integrated transistor for controlling current flow through the coil.

The invention claimed is:

1. A contactor comprising:
a first power terminal;
a second power terminal;
a sub-circuit electrically connected between the first power terminal and the second power terminal, and comprising at least the following three elements connected in series: an electrical conductor portion, a primary switch and a fuse;
the primary switch comprising a movable part driven by an actuator;
a magnetic sensor configured for measuring a primary current flowing through the electrical conductor portion;
a controller communicatively connected to said magnetic sensor for measuring said primary current flowing through the electrical conductor portion using said magnetic sensor, and operatively connected to said actuator for selectively opening and closing said primary switch;
wherein the contactor further comprises detection means other than the magnetic sensor for detecting whether the primary switch is actually open or closed;
wherein the controller is configured for:
i) measuring the primary current using the magnetic sensor, and detecting if an overcurrent condition occurs; and if an overcurrent condition is detected, continuing with step ii);
ii) operating the actuator to open the primary switch;
iii) detecting if the primary switch is effectively open; and if it is detected that the primary switch is still closed, blowing the fuse.

2. The contactor of claim 1, wherein the detection means is configured for detecting whether the primary switch is actually open or closed in a manner which is independent from the current measurement performed by the magnetic sensor.

3. The contactor of claim 1, wherein the controller is configured for:
a) repeatedly measuring a primary current flowing through the electrical conductor portion using the magnetic sensor;
b) detecting if an overcurrent condition occurred based on the measured primary current, and if it is detected that an overcurrent occurred, continuing with step c);
c) determining an available time period (Δtav) to open the primary switch;
d) comparing the available time period (Δtav) and a required time period (Δtreq) to open the primary switch, and if the available time period is smaller than the required time period, continuing with step f); otherwise continuing with step e);
e) operating the actuator to open the primary switch;
f) detecting whether the primary switch is effectively open, and in case the primary switch is still closed after the available time period (Δtav), blowing the fuse.

4. The contactor of claim 1, wherein the controller has at least one communication port connectable to an external processor; and
wherein the controller is further configured for receiving at least one command selected from the group consisting of:
a command to close the primary switch, a command top open the primary switch, a command to blow the fuse; and wherein the controller is further configured for performing at least one of the following:
x) upon receipt of a command to close the primary switch, to operate the actuator to close the primary switch;
y) upon receipt of a command to open the primary switch, to perform step ii) and iii);
z) upon receipt of a command to blow the fuse, to blow the fuse.

5. The contactor of claim 1, wherein the contactor is capable of conducting a current of at least 60 Amps; and
wherein the contactor further comprises a third and a fourth power terminal for receiving a voltage supply of at most 48 Volt.

6. The contactor of claim 1, wherein the fuse is or comprises a pyro-fuse or a squib.

7. The contactor of claim 1, wherein the actuator comprises a coil and an element which is movable relative to said coil.

8. The contactor of claim 7, wherein the controller is further configured for measuring a secondary current flowing through the coil; and
wherein the controller is further configured for determining the primary current based on the signal obtained from the magnetic sensor and taking into account the secondary current in order to reduce an influence of a magnetic field generated by the secondary current.

9. The contactor of claim 7, wherein the detection means comprises a shunt resistor configured for measuring a current flowing through the actuator; and
wherein the controller is further configured for measuring a voltage over this shunt resistor in order to determine a current flowing through the shunt resistor and through the coil; and
wherein the controller is further configured for repeatedly sampling the current flowing through this shunt resistor thereby obtaining a current waveform, and for analysing this current waveform in order to detect a characteristic indicative of movement of the movable element.

10. The contactor of claim 1, wherein the detection means comprises a position sensor for detecting a position of the movable element; and
wherein the controller is connected to said position sensor for determining the position of the movable element, thereby determining the status of the primary switch.

11. The contactor of claim 1, wherein the magnetic sensor comprises at least one horizontal Hall element, or at least one vertical Hall element, or at least one magneto-resistive element, arranged in the vicinity of said electrical conductor portion, and configured for measuring a magnetic field component generated by the current flowing through said electrical conductor portion; or
wherein the magnetic sensor comprises at least two horizontal Hall elements or at least two vertical Hall elements, spaced apart from each other and oriented in parallel, and configured for measuring a magnetic field difference or a magnetic field gradient.

12. The contactor of claim 1, further comprising an accelerometer and/or a gyroscope connected to the controller; and
wherein the controller is further adapted for determining an abnormal condition based on signals obtained from said accelerometer and/or said gyroscope; and
wherein the controller is further configured for autonomously opening the primary switch and/or to blow the fuse.

13. The contactor of claim 1, wherein the controller is implemented in an integrated semiconductor device; and
  wherein the magnetic sensor is also integrated in said semiconductor device; and
  wherein the actuator comprises a coil connected in series with a second switch; and
  wherein the detection means comprises a shunt resistor connected in series with said coil; and
  wherein the controller is configured for sampling a first voltage over said shunt resistor, and for sampling a second voltage over said coil or over the series connection of said coil and said shunt resistor, and for determining a status of the primary switch based on the first and second voltage samples; and
  wherein the controller has a first output for controlling the actuator for operating the primary switch; and
  wherein the controller has a second output for blowing the fuse.

14. An integrated circuit for use in the contactor of claim 1, the integrated circuit comprising:
  said controller in the form of a programmable processor;
  said magnetic sensor;
  a shunt interface for sensing a voltage over a shunt resistor connectable to the integrated circuit, from which voltage a secondary current can be determined;
  a first output for driving the actuator connected to the primary switch;
  a second output for activating a fuse driver;
  wherein the processor is configured for:
    i) measuring a primary current using said magnetic sensor, and detecting if an overcurrent condition occurs; and if an overcurrent condition is detected, continuing with step ii) otherwise repeating step i);
    ii) asserting the first output for operating the actuator to open the primary switch;
    iii) detecting if the primary switch is effectively open by analysing signals obtained from the shunt interface; and if it is detected that the primary switch is still closed after a time interval, asserting the second output for blowing the fuse.

15. The integrated circuit of claim 14, further comprising: a voltage sensing interface for sensing a voltage over a coil; and
  wherein the processor is configured for iii) detecting if the primary switch is effectively open by analysing signals obtained from the shunt interface and signals obtained from the voltage sensing interface.

16. The integrated circuit of claim 14, further comprising a digital communication interface for receiving instructions from an external processor; and
  wherein the processor is further configured for performing steps ii) and iii) upon receipt of an instruction from the external processor to open the primary switch.

17. The integrated circuit of claim 14, furthermore comprising one or more of the following features:
  a 12 Volt supply input;
  a PWM-generator connectable to said first output;
  a timer unit;
  an Negative Temperature Coefficient component interface to measure an external temperature;
  a first communication interface for communicating with an airbag ECU;
  a second communication interface for communicating with a controller of a battery management system.

18. A contactor comprising:
  a first power terminal;
  a second power terminal;
  a sub-circuit electrically connected between the first power terminal and the second power terminal, and comprising at least the following three elements connected in series: an electrical conductor portion, a primary switch comprising a movable part driven by an actuator, and a fuse;
  a magnetic sensor configured for measuring a primary current flowing through the electrical conductor portion;
  a controller communicatively connected to said magnetic sensor for measuring said primary current flowing through the electrical conductor portion using said magnetic sensor, and operatively connected to said actuator for selectively opening and closing said primary switch;
  wherein the controller has a communication port connectable to an external processor for receiving a command to open or to close the primary switch;
  wherein the controller is configured for:
    i) operating the actuator to open the primary switch;
    ii) detecting if the primary switch is effectively open; and if it is detected that the primary switch is still closed, blowing the fuse.

* * * * *